Oct. 23, 1962     L. R. GRABOWSKI ET AL     3,059,494
PRELOADED BALL BEARING SCREW
Filed July 27, 1960

INVENTORS
Leonard R. Grabowski, &
BY Donald J. Holthofer

Bryce Beecher
ATTORNEY

Patent text

3,059,494
PRELOADED BALL BEARING SCREW

Leonard R. Grabowski, Bay City, Mich., and Donald J. Holthofer, Sepulveda, Calif., assignors to General Motors Corporation, Detroit, Mich., a corporation of Delaware
Filed July 27, 1960, Ser. No. 45,580
9 Claims. (Cl. 74—441)

This invention relates to devices for translating linear motion into rotary motion or vice versa, and more particularly concerns an improvement in ball bearing screw and nut assemblies.

Such assemblies find wide application in industry. Depending on the particular application, it may be necessary or desirable to employ two nuts in tandem relation on the screw and to place the contained balls under a preload, eliminating lash between the screw and nut. This is often true, for example, when the screw and nut assembly is employed for the precise positioning of a machine part or work-piece.

Heretofore it has been the practice to eliminate the lash by drawing the two ball nuts toward one another while the same are disposed on the screw with a compressible shim therebetween, the required force being applied through hex nuts carried by bolts passing through flanges at the juxtaposed ends of the ball nuts.

The described flanges complicate the manufacture and increase the cost of the ball nuts and in some cases preclude use of the assembly because of clearance limitations. Accordingly, a principal object of the invention is to effect the preloading of the balls without the use of flanges or similar means.

Other objects and features of the invention will be apparent from the following description which will proceed with reference to the accompanying drawings illustrating preferred embodiments of the invention.

Figure 1:
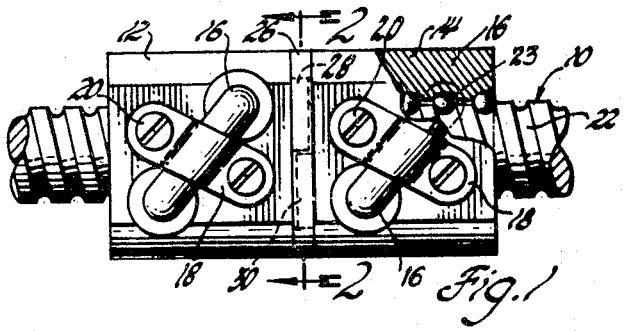
FIGURE 1 is a longitudinal elevation of a ball nut and screw assembly incorporating the invention, the screw being shown broken away.

Referring first to FIGURE 1, the numeral 10 denotes the screw component of the assembly. Carried thereon are ball nuts 12 and 14 of generally conventional design. Thus, the nuts are equipped with return tubes 16 made fast to the nuts by means of clamps 18 secured by screws 20. The tubes 16 make endless the ball races provided by the groove 22 in the screw and complementary helical grooves 23 formed internally of the nuts.

In use of a device as illustrated, either the screw or the nut assembly may be connected to the power source. Most frequently, it is the screw which is rotated to cause the nuts to travel lineally thereon, but in some instances the nuts are caused to rotate while held against axial movement to bring about lineal travel of the screw.

Figure 2:
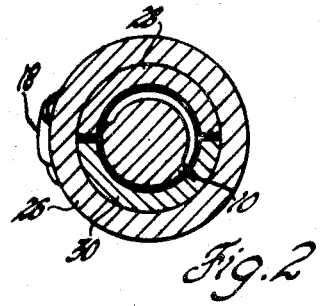
FIGURE 2 is a section on the line 2—2 in FIGURE 1.
Figure 3:
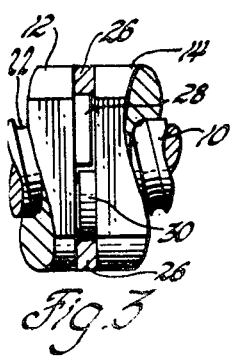
FIGURE 3 is a fragmentary elevation partly in section showing the juxtaposed ends of the ball nuts.

In accordance with the invention, a shim element 26 is disposed between nuts 12 and 14 to preload the contained balls thereby to take up the normally existing lash between the screw and nuts. Such element 26 will be seen as encircling the projections 28 and 30 (FIGS. 2 and 3) carried by the nuts at the juxtaposed ends thereof. Also, it will be observed that each projection 28, 30 is formed on a half circle and that the illustrated arrangement precludes relative rotation of the nuts on the screw.

In the assembly of the illustrated device the nuts are first placed on the screw with the semi-circular end projections overlapping. The two ball circuits are then loaded in the usual manner with the required number of balls, whereafter the nuts are urged apart by means of a suitable tool to preload the balls. Next, the space between the nuts is measured to determine the width of shim required to maintain the preload. With this accomplished, the two nuts with the separating tool removed are threaded to one end of the screw and the outermost nut removed on an ungrooved spindle of a diameter preventing loss of the balls from such nut. Subsequently, by means of the spindle, the removed nut, with the shim thereon, is brought into juxtaposition with the nut remaining on the end of the screw so that the half circle projections are disposed with their flat surfaces overlapping. When the removed nut is threaded back on the screw, this operation of itself provides the preload since the presence of the shim acts to mismatch the internal grooves of the nuts relative to the groove of the screw.

Figure 4:
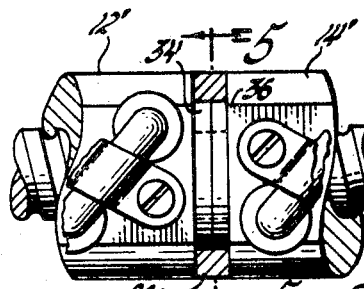
FIGURE 4 is a view similar to FIGURE 3 illustrating a modification.
Figure 5:
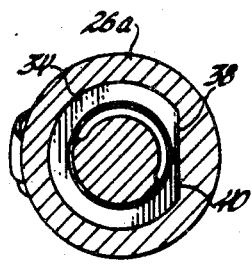
FIGURE 5 is a section on the line 5—5 in FIGURE 4.

Going now to FIGURES 4 and 5, it will be noted that in this modification the projections 34 and 36 carried by the nuts 12′ and 14′ respectively each have an abutment or flat 38 coacting with a flat 40 on the inner surface of the shim 26a to prevent relative rotation of the nuts. The shim 26a acts as shim 26 (FIGS. 1–3) to preload the balls in ball trains through which the nuts and screw are interconnected.

Figure 6:
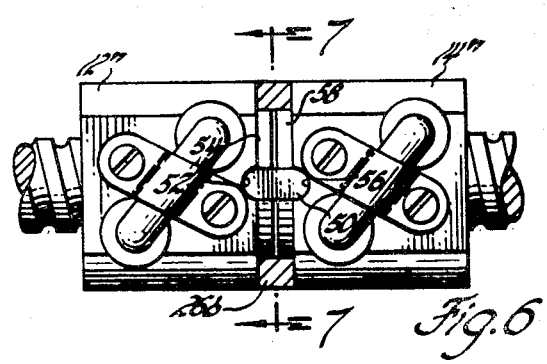
FIGURE 6 illustrates a second modification.
Figure 7:
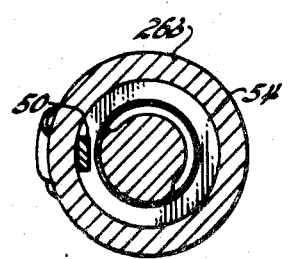
FIGURE 7 is a section on the line 7—7 in FIGURE 6.

In the case of the modification to which FIGURES 6 and 7 are directed, relative rotation of the nuts 12″ and 14″ is prevented by a key 50 accommodated in part in a slot 52 in the nut 12″ and in part in a matching slot 56 in the nut 14″. The ball-preloading shim 26b surrounding the reduced portions 54 and 58 of the nuts secures the key.

Figure 8:
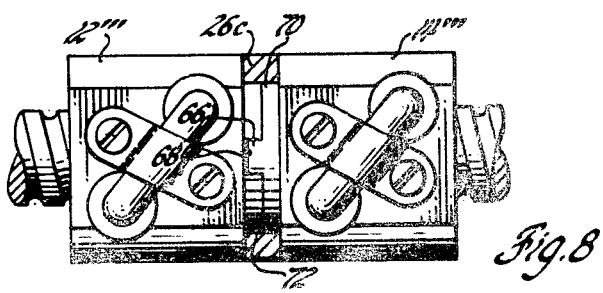
FIGURE 8 illustrates a third modification.

In the design of FIGURE 8, relative rotation of the nuts 12‴ and 14‴ is prevented by a tang and slot connection therebetween. Thus, the nut 14‴ is provided with a reduced portion 70 carrying a tang 66 and nut 12‴ with a reduced portion 72 having a slot 68 therein complementary to the tang. The ball preloading shim 26c is accommodated in the annular space formed by the reduced portions 70 and 72 in conjunction with the body portions of the nuts.

It is important to note that in the case of each of the illustrated designs the outer surface of the shim is flush with or below that of the bodies of the nuts. Accordingly, there is no increase in the outer diameter of the nut assembly, as is true of the prior designs utilizing flanges in connection with attainment of the preload, and the assembly is rendered suited for installations for which the flanged designs are unadapted.

In some cases it may be desirable to employ shim means, as a spring washer of predetermined resiliency, which becomes compressed to some degree incident to the preloading and which therefore is capable of compensating for wearing of the parts during use without loss of the preload. Using such shim means, the ball nuts and shim are first placed about the worm whereafter by suitable clamping means the two nuts are urged together to a near normal (unpreloaded) position for free assembly of the balls, tubes and clamps. Finally, the clamping means are removed allowing the shim to urge the nuts apart, giving the preload.

We claim:

1. A device for translating linear motion into rotary motion or vice versa comprising: a screw component, a pair of nuts carried on said screw in end-to-end relation and having juxtaposed reduced end portions, coacting means associated with said nuts and limited in location to such ends thereof serving to prevent relative rotation of said nuts, each of said nuts having an internal helical groove formed complementarily to the screw groove to provide ball races, a train of balls in each race, and shim means mediate the bodies of said nuts exerting an axial force on the balls of said trains to preload the same.

2. A device for translating linear motion into rotary motion or vice versa comprising: a screw component, a pair of nuts carried on said screw and having juxtaposed reduced end portions coacting to prevent relative rotation of the nuts on the screw, each of said nuts having an internal helical groove formed complementarily to the screw groove to provide a ball race, a train of balls in each such race, and shim means overlying said reduced end portions and exerting an axial force against the bodies of said nuts thereby to preload the balls of said trains.

3. A device for translating linear motion into rotary motion or vice versa comprising: a screw component, a pair of nuts carried on said screw in end-to-end relation, projections at the juxtaposed ends of said nuts coacting to prevent relative rotation thereof, each said nut having an internal helical groove formed complementarily to the screw groove to provide a ball race, a train of balls in each such race, and shim means overlying said projections and exerting an axial force against the bodies of said nuts to preload the balls of said trains.

4. A device for translating linear motion into rotary motion or vice versa comprising: a screw component, a pair of nuts carried on said screw in juxtaposition and having internal helical grooves formed complementarily to the screw groove to provide ball races, the juxtaposed end portion of each said nut being reduced and having an abutment surface, the two such surfaces coacting to prevent relative rotation of said nuts, a train of balls in each such race, and shim means overlying said reduced portions and exerting an axial force against the bodies of said nuts to preload the balls of said trains.

5. A device for translating linear motion into rotary motion or vice versa comprising: a screw component, a pair of nuts carried on said screw in juxtaposition and having internal helical grooves formed complementarily to the screw groove to provide ball races, the juxtaposed end portion of each said nut being reduced and having an abutment surface, a train of balls in each of said races, and shim means overlying said reduced portions and exerting an axial force against the bodies of said nuts to preload the balls of said trains, said shim means having and abutment surface coacting with said first-mentioned abutment surfaces to prevent relative rotation of said nuts.

6. A device for translating linear motion into rotary motion or vice versa comprising: a screw component, a pair of nuts carried on said screw in juxtaposition and having internal helical grooves formed complementarily to the screw groove to prove ball races, the juxtaposed end portion of each said nut being reduced and being formed on a half circle, such portions of said nuts coacting to prevent relative rotation of said nuts, a train of balls in each of said races, and shim means overlying said reduced portions of said nuts and exerting an axial force against the bodies of said nuts to preload the balls of said trains.

7. A device for translating linear motion into rotary motion or vice versa comprising: a screw component, a pair of nuts carried on said screw in juxtaposition and having internal helical grooves formed complementarily to the screw groove to provide ball races, the juxtaposed end portion of each said nut being reduced and having a flatted surface, a train of balls in each said race, and shim means overlying said reduced portions of said nuts and exerting an axial force against the bodies of said nuts to preload the balls of said trains, said shim means being provided with a flatted surface cooperating with said first flatted surfaces to prevent relative rotation of said nut.

8. A device for translating linear motion into rotary motion or vice versa comprising: a screw component, a pair of nuts carried on said screw in juxtaposition and having internal helical grooves formed complementarily to the screw groove to provide ball races, the juxtaposed end portions of said nuts being reduced and being adapted for the accommodation of a key serving to prevent relative rotation of said nuts, a train of balls in each of said races, and shim means overlying said reduced portions of said nuts and said key, said shim means exerting an axial force against the bodies of said nuts to preload the balls of said trains.

9. A device for translating linear motion into rotary motion or vice versa comprising: a screw component, a pair of nuts carried on said screw in juxtaposition and having internal helical grooves formed complementarily to the screw grooves to provide ball races, the juxtaposed end portions of said nuts being reduced and being formed to provide a tang and slot connection between said nuts whereby relative rotation thereof is prevented, a train of balls in each of said races, and shim means overlying said reduced portions of said nuts and exerting an axial force against the bodies of said nuts to preload the balls of said trains.

References Cited in the file of this patent

UNITED STATES PATENTS

| | | |
|---|---|---|
| 1,383,239 | Roland | June 28, 1921 |
| 2,498,897 | Riedel | Feb. 28, 1950 |
| 2,749,812 | Wentzel | June 12, 1956 |
| 2,791,128 | Geyer et al. | May 7, 1957 |
| 2,842,978 | Orner | July 15, 1958 |
| 2,919,596 | Knehl | Jan. 5, 1960 |
| 2,924,113 | Orner | Feb. 9, 1960 |
| 2,933,941 | Millins | Apr. 26, 1960 |